T. O. PERRY.
FRICTION CLUTCH.
APPLICATION FILED JULY 11, 1918.
1,345,100.
Patented June 29, 1920.
2 SHEETS—SHEET 1.
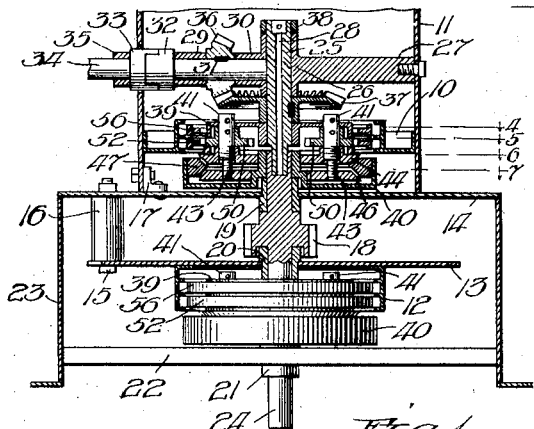
Fig. 1.
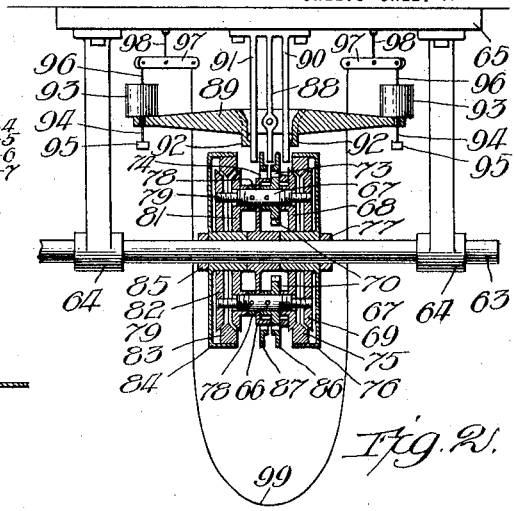
Fig. 2.
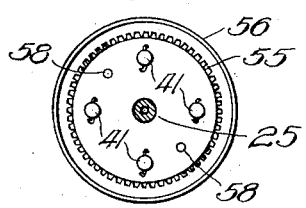
Fig. 3.
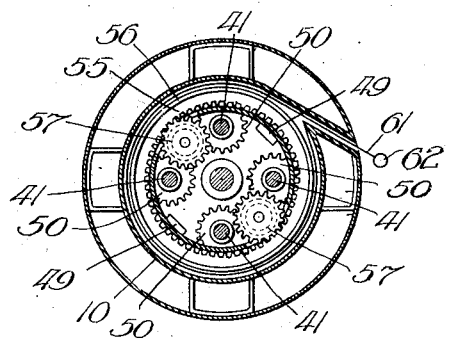
Fig. 4.
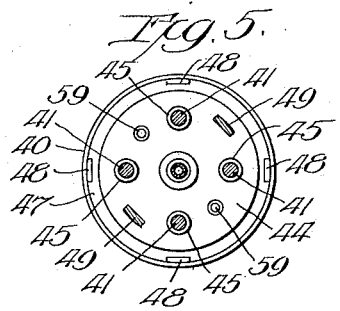
Fig. 5.
Fig. 7.
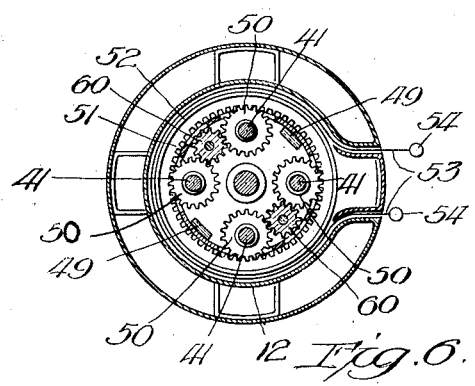
Fig. 6.
INVENTOR:
Thomas O. Perry.

T. O. PERRY.
FRICTION CLUTCH.
APPLICATION FILED JULY 11, 1918.

1,345,100.

Patented June 29, 1920.
2 SHEETS—SHEET 2.

INVENTOR

Thomas O. Perry.

UNITED STATES PATENT OFFICE.

THOMAS O. PERRY, OF OAK PARK, ILLINOIS.

FRICTION-CLUTCH.

1,345,100.　　　　　Specification of Letters Patent.　　Patented June 29, 1920.

Application filed July 11, 1918. Serial No. 244,509.

*To all whom it may concern:*

Be it known that I, THOMAS O. PERRY, a citizen of the United States, and a resident of Oak Park, in the county of Cook and State of Illinois, (whose post-office address is 324 North Euclid Ave., Oak Park, Illinois,) have invented a new and useful Friction-Clutch, of which the following is a specification.

My invention relates to improvements in friction clutches whereby frictional driving connection may be made or released between two shafts placed end to end in suitable bearings or between a shaft and one or more pulleys or wheels upon the shaft or having a common axis therewith; and the objects of my improvements are, first, to provide for varying degrees of cohesion between the shafts or other parts which are to be brought into or released from frictional connection; second, to avoid retaining external connection with either or any part of the clutching mechanism after connection has been made or released; and third, to effect manipulation of the clutch in the smallest possible amount of space occupied in an axial direction.

I attain these objects by the mechanism illustrated in the accompanying drawing, in which—

Figure 8:
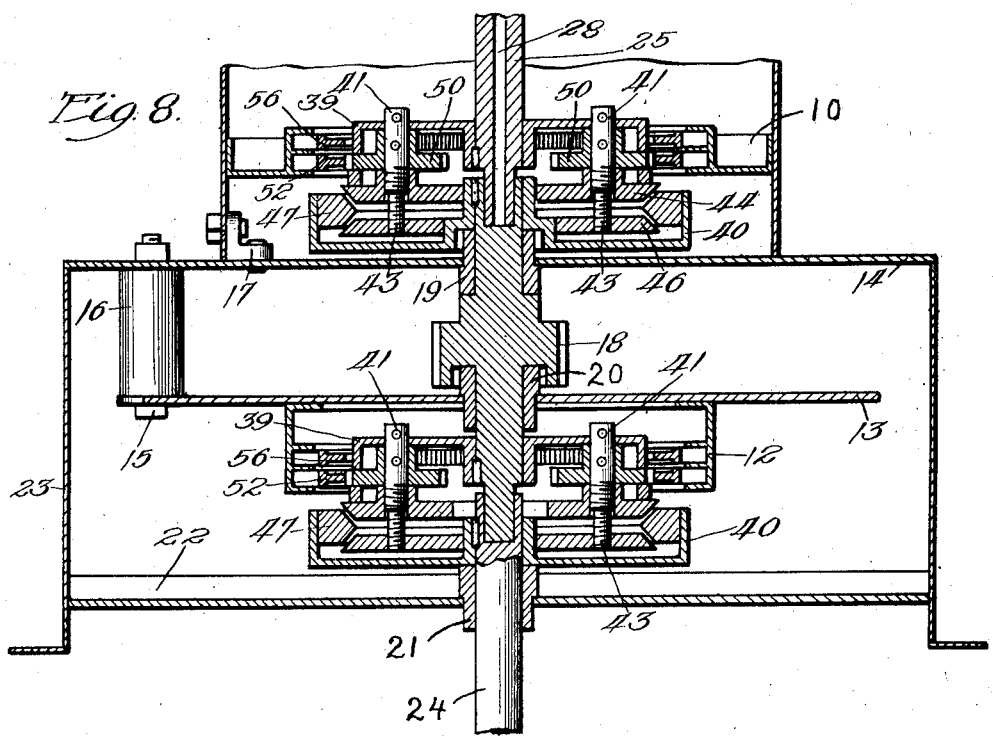
Figure 9:
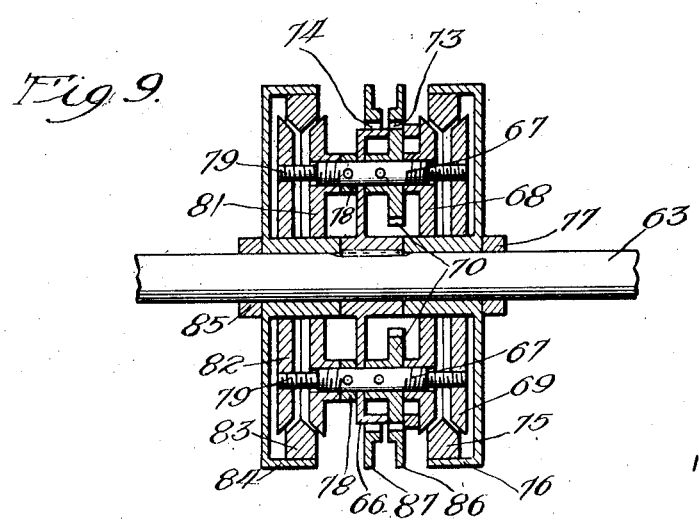

Figure 1 shows two superposed clutches mounted on separate shafts and a driven pinion in line between them which may be connected with or disconnected from either of the two driving shafts at will. The upper clutch is shown in sectional view and the exterior of the moving parts of the lower clutch is shown partially inclosed by a shield which shows in section. Fig. 2 shows a double clutch in vertical section mounted on a horizontal driving shaft which carries two loose pulleys which may be alternately made to engage and disengage the shaft. Fig. 3 is a view looking down on the top of the revolving parts as shown in Fig. 1. Fig. 4 is a horizontal section of the clutch as shown in Fig. 1 taken below the line —4 on Fig. 1. Fig. 5 is a sectional view taken at the line —5 on Fig. 1. Fig. 6 is a sectional view taken at the line —6 on Fig. 1. Fig. 7 is a sectional view taken at the line —7 on Fig. 1. Fig. 8 is an enlargement of the clutch parts of Fig. 1 showing both upper and lower clutches in section and Fig. 9 is an enlarged view in section of the clutch parts of Fig. 2.

Similar numerals refer to similar parts throughout the several views.

Referring to Fig. 1, the structure of the two clutches here shown is precisely the same except that the encircling shield 10 of the upper clutch is attached to a tubular column 11, while the corresponding shield 12, encircling the lower clutch, is attached to a lower bearing plate 13 just above the clutch. This lower bearing plate is fixed to the upper bearing plate 14 by means of strong bolts 15 inclosed by spacing blocks 16 and the upper bearing plate is in turn fixed to the base of the tubular column 11 by means of angle irons 17. Between the two bearing plates a pinion 18 is journaled in bearings 19 and 20, the upper bearing 19 being held by the upper bearing plate and the lower bearing 20 held by the lower bearing plate. The bearing 21 below the lower clutch is held by a channel bar 22 whose extremities are secured to the cylindrical inclosure 23 which is in turn supported by the upper bearing plate 14. A short lower driving shaft 24 is journaled in the bearing 21 and held thereby in line with the lower pinion journal. In a similar manner the upper driving shaft 25 is held axially in line with the upper journal of the pinion by a vertical bearing 26 in a bracket 27 attached to the inner wall of the tubular column. The vertical driving shaft is shown reduced in diameter at its lower extremity and centered in the upper pinion journal, the shaft having a vertical bore 28 for convenience in lubrication, though it is not necessary that the two shafts shall have actual contact with each other. The bracket 27 has two other bearings 29 and 30 in which is journaled a horizontal shaft 31 whose outer end has a notched coupling part 32. A similar notched coupling part 33 serves to connect the horizontal driving shaft 34 with shaft 31, the coupling part 33 protruding through an opening in the wall of the supporting column. A thrust bearing 35 attached to the exterior wall of the tubular column prevents separation of the notched coupling parts 32 and 33.

Between the bearings 29 and 30 the shaft 31 has keyed thereto a bevel pinion 36 which engages the bevel gear wheel 37 keyed to the shaft 25 just below the bearing 26.

A collar 38 on shaft 25 prevents vertical displacement of the shaft. The shaft 34 is supposed to be actuated by some kind of motive power and the shaft 24 is also supposed to receive actuation from a motor, the two sources of power being independent of each other.

The clutch mechanisms of the upper and lower clutches are both the same and are arranged in the same order as regards the position of their various parts. The upper housing 39 of each clutch is fixed to the lower end of a shaft which in one case is shaft 25 and in the other case is the lower journal of pinion 18. The lower casing 40 of each clutch is fixed to the upper end of a shaft, which in one case is shaft 24 and in the other case is the upper journal of the pinion 18. The housing 39 consists of a web extending laterally from a central hub and from whose periphery a cylindrical wall extends downward. The casing 40 has a similar web from whose periphery a cylindrical wall extends upward.

Depending from bearings in the web of housing 39 and secured against longitudinal displacement therewith are four screw shafts 41 each having superposed right and left hand screw threads at their lower extremities. For convenience in fabrication and assembling, the right hand threads 43 are cut on reduced diameters of the screw shafts at their extreme ends. The upper friction disk 44 has four bosses 45 threaded to receive the left hand threads of the screw shafts, and the lower friction disk 46 is similarly pierced and threaded in four places to receive the right hand screw threads. The upper and lower friction disks are separated by a short interval and have beveled peripheral surfaces facing each other. Included between these beveled disk surfaces and equally distant from each is located a friction ring 47 preferably made of fiber or leather, having beveled surfaces facing inward to match the beveled surfaces of the friction disks, but this friction ring 47 is carried by the cylindrical wall of the casing 40 which has drive ribs 48 fitting into corresponding peripheral notches indenting the friction ring. The upper and lower friction disks are loosely pierced and guided by two opposite vertical guides 49 which are fixed to and depend from the housing 39.

Each of the four screw shafts has fixed thereto, by a pin through the hub, a spur gear wheel 50 whose teeth protrude through slots in the cylindrical wall of the housing where they engage the internal teeth of the lower manipulative ring gear 51, the points of whose teeth bear against the external wall of the housing. The outer friction rim 52 of the manipulative gear has a smooth surface suitable for frictional engagement with a flexible retarding band 53 whose free ends protrude outside of the shields 10 and 12 and terminate in hand knobs 54 conveniently placed for an operator to grasp. The encircling shields 10 and 12 serve the purpose of holding the retarding bands within manipulative distance of the friction rims.

Above the ring gear 51 is an upper ring gear 55 having a friction rim 56 precisely like the lower ring gear and rim, but the teeth of this ring gear engage with the teeth of two oppositely placed reverse gear wheels 57 whose teeth protrude through the casing wall and whose bearings are vertical studs 58 fixed at their upper ends to the web of the housing. The lower ends of these bearing studs may extend loosely into holes 59 in the upper friction disk 44. Underneath and integral with each of the reverse gears 57 are inter-pinions 60, each pinion meshing with two of the spur gears 50. The upper retarding band 61 is held by the shield 10 or 12 the same as previously described for the lower band except that only one of the ends is free and terminates in a hand knob 62. The other end is fastened to the shield near where the free end emerges.

Fig. 2 shows a doubled form of the clutch mounted on a single horizontal line shaft 63 whose bearings 64 depend from a ceiling-block 65. The line shaft is supposed to be driven by some kind of motive power. The central housing 66 is keyed to the line shaft and has on the right side of its web a cylindrical wall precisely like the cylindrical wall of housing 39 and carries screw shafts 67, friction disks 68 and 69, spur gears 70, ring gears 73 and 74 and other parts all constructed and operating the same as corresponding parts of the same name mentioned in connection with Fig. 1. The friction ring 75 also corresponds exactly in form and function with the friction rings shown in Fig. 1 and is carried by a casing in the same way, but in this case the casing constitutes a pulley 76 normally loose on the line shaft and adapted to transmit motion by means of a belt on its peripheral wall. A collar 77 on the line shaft prevents axial movement of the pulley. Collars 78 secured by pins prevent axial movement of the screw shafts.

These screw shafts 67 extend also to the left of housing 66 terminating in reduced ends 79 having right hand screw threads in juxtaposition to the left hand screw threads of larger diameter and carry friction disks 81 and 82 whose forms and functions are the same as those parts of similar name to the right of the central housing. Friction ring 83, pulley 84 and collar 85 are entirely similar to the corresponding parts before described on the right.

The friction rims 86 and 87 serve the same purpose as the friction rims 52 and 56 previously described but are slightly different in shape, having thinner edges so as to make room between them for the lower end of a flexible bar 88 on which the balanced lever 89 is fulcrumed. Outside of the two friction rims and suitably placed for engaging the same in conjunction with the fulcrum bar are the lower ends of two other flexible side bars 90 and 91. The three flexible bars are united at their upper ends and secured to the ceiling block. The balanced lever 89 has two spurs 92 adapted to press inward toward the fulcrum bar the end of either one of the side bars according as one end or the other of the balanced lever is depressed and thus grab one or the other of the two friction rims. Balancing weights 93 rest upon opposite ends of the balanced lever and have short rods 94 loosely depending through holes in the lever and terminating in knobs 95 a short distance below. Short rods 96 also extend up from the weights and have pivotal connection with the outer ends of short levers 97 fulcrumed centrally by links 98 hanging from the ceiling-block. To the inner ends of the short levers are connected the ends of a cord or rope 99 hanging in a loop where it may be readily hand grasped.

Normally the balanced lever 89 is held in a horizontal position by contact of the spurs 92 with the flexible side bars 90 and 91, but, if by pulling the rope 99 one of the weights 93 is lifted from one end of the lever, the other end will be depressed by the other weight causing one or the other of the friction rims 86 or 87 to be grasped and retarded in speed of revolution relatively to the rotational speed of the clutch housing. Consequently, the spur gears 70 and screw shafts 67 will all revolve in unison relatively to the housing 66 causing the two friction disks on one side of the housing to be screwed toward each other while at the same time the other two friction disks on the other side of the housing will be axially screwed apart by the right and left hand screw threads. In other words, one of the friction rings 75 or 83 will be pinched when the other is released, and the two pulleys 76 and 84 may alternately have driving connection with the line shaft 63 but not both at the same time. Of course this condition might be changed by reversing the order of the right and left hand threads on one end of each screw shaft 67 which would cause both pulleys to be grasped simultaneously, or released. The direction of revolution of the line shaft would determine the order in which the right and left hand pulleys are actuated and released for like manipulation of the balanced lever. The balancing weights are supposed to limit the amount of friction applied to the friction rims to some specific requirement and if more friction is at any time needed, a further lifting of the weights will cause engagement of the knobs 95 with the lever and increase the driving friction any amount desired. By direct connection of the rope ends with the ends of the balancing lever the retarding friction can be manipulated without intervention of the balancing weights. After enough pressure has accumulated between friction disks and friction ring, the retarding friction is released from the friction rim by simply letting go the rope, and the right and left screw threads hold the pressure until the balancing lever is oppositely manipulated.

The construction and arrangement shown in Fig. 1 is taken from my pending application, Serial No. 244,508 for aircraft, filed July 11, 1918, and shows how two sources of power may be made available for actuating the same motive pinion either conjunctively or independently of each other by means of this clutch or duplicates thereof.

First suppose the driving shaft 34 to be connected with a motor, which amounts to the same thing as making vertical shaft 25 the driving member. Now if the proper retarding band 53 or 61, of the upper clutch is brought into frictional contact with the corresponding friction rim, driving connection will be made between the shaft 25 and the motive pinion 18. In the same way the actuated pinion may be put into driving connection with the lower vertical shaft 24 by manipulating the lower clutch, and if a gas motor is connected with this lower shaft it may receive its initiative motion for starting in this manner. Afterward, if both motors are not needed, either one may be disconnected by pulling the proper hand knob 62 or 54, the proper one depending upon the direction in which the shafts are made to revolve. The retarding bands 53 and 61 are supposed to be flexible enough to hug the friction rims when tightened by pulling the hand knobs and to have rigidity sufficient for pushing them clear of the friction rims when the clutches are released.

If it should be required to release a clutch when neither driving shaft 24 or 25 is motor actuated it would be necessary to provide each free end of at least one of the two friction bands with hand knobs as shown in Fig. 6 so that the band could be pulled from both ends and worked to and fro for revolving the friction rim by hitches in either direction. The double hand knobs would also be needed for making engagement between motor driven friction rings 47 and non-revolving friction disks 44 and 46, as, for example, when connections are to be made in a reverse order from that first described.

However, when double hand knobs are used, the result is the same, whichever one may be pulled, if the corresponding friction rim has actuated motion, which it is generally supposed to have.

I claim:

1. In a friction clutch, the combination with two friction disks, a friction ring adapted to be grasped between the peripheries of said friction disks and a ring holder journaled concentrically with said disks, of multiple screw shafts having right hand threads engaging one of said disks and left hand threads engaging the other of said disks, synchronizing gears for actuating said screw shafts in one direction, counter-gears for actuating said screw shafts in a reverse direction, a housing for carrying said screw shafts and gears about the axis of said disks, said housing having peripheral slots through which the teeth of said gears protrude, two friction rims concentric with said axis encircling said housing, one rim having direct actuating connection with said synchronizing gears and the other rim having therewith indirect connection through said counter-gears and means whereby either rim may be grasped at will and retarded or actuated relatively to the rotational speed of said housing, substantially as herein set forth.

2. In a friction clutch, the combination with two friction disks, a friction ring adapted to be grasped between the peripheries of said disks for concentric rotation therewith and a ring holder journaled for rotation independently of the disks, of multiple screw shafts having right hand threads engaging one disk and left hand threads engaging the other disk, synchronizing gears for actuating said screw shafts in one direction, counter-gears for actuating the screw shafts in a contrary direction, a housing for carrying said screw shafts and gears about the common axis of said disks and friction ring, said housing having peripheral slots through which the teeth of said gears protrude, two friction rims concentric with said common axis encircling said housing, one rim having direct actuating connection with said synchronizing gears and the other rim having actuating connection with said counter-gears and means whereby either friction rim may be grasped at will and retarded relatively to the rotational speed of said housing, substantially as herein set forth.

3. In a friction clutch, the combination with two friction disks, a friction ring adapted to be grasped between the peripheries of said friction disks and a ring holder journaled concentrically with said disks, of multiple screw shafts having right hand threads engaging one of said disks and left hand threads engaging the other of said disks, synchronizing gears for actuating said screw shafts in one direction, counter gears for actuating said screw shafts in a reverse direction, a housing for carrying said screw shafts and gears about the axis of said disks, said housing having peripheral slots through which the teeth of said gears protrude, two friction rims concentric with said axis encircling said housing, one rim having direct actuating connection with said synchronizing gears and the other rim having therewith indirect connection through said counter-gears, friction bands encircling said friction rims adapted to hold or release said rims at will and encircling shields for sustaining said bands when released from the friction rims, substantially as herein set forth.

THOMAS O. PERRY.